United States Patent [19]

Gross

[11] Patent Number: 5,222,103
[45] Date of Patent: Jun. 22, 1993

[54] DIFFERENTIAL QUADRATURE PHASE SHIFT KEYING ENCODER FOR SUBCARRIER SYSTEMS

[75] Inventor: Richard W. Gross, Arlington, Mass.

[73] Assignee: GTE Laboratories Incorporated, Waltham, Mass.

[21] Appl. No.: 637,895

[22] Filed: Jan. 2, 1991

[51] Int. Cl.$^5$ ............................................ H04L 27/18
[52] U.S. Cl. ............................. 375/54; 345/84; 345/67; 359/279; 332/103; 329/304
[58] Field of Search .............. 375/54, 85, 67; 455/45; 370/12, 20, 69.1, 121; 359/181, 183, 279; 332/103, 163; 329/304, 306

[56] References Cited

U.S. PATENT DOCUMENTS 3,875,400 4/1975 Pao et al. .................... 359/181 X
4,285,062 8/1981 Yoshida et al. .................. 370/12 X Primary Examiner—Curtis Kuntz
Assistant Examiner—Tesfaldet Bocure
Attorney, Agent, or Firm—Lawrence E. Monks

[57] ABSTRACT

This invention features a differential QPSK digital communications apparatus and method, suitable for optical communications systems, where a pair of synchronous binary input data streams $S_0(t)$ and $S_1(t)$ are encoded into a pair of encoded binary data streams $d_0(t)$ and $d_1(t)$ which QPSK modulate the phase $\phi(t)$ of a carrier signal. An encoder features time delay circuits for delaying $d_0(t)$ and $d_1(t)$ by a period T to produce $d_0(t-T)$ and $d_1(t-T)$ respectively. A logic circuit produces $d_0(t)$ and $d_1(t)$ from $S_0(t)$, $S_1(t)$, $d_0(t-T)$ and $d_1(t-T)$ according to logical relationships. A microwave subcarrier is modulated by a microwave QPSK subcarrier modulator. The microwave QPSK subcarrier modulator includes an in-phase and quadrature subcarrier signal source, a mixer for mixing the in-phase subcarrier with $d_0(t)$, a second mixer for mixing the quadrature subcarrier with $d_1(t)$, and a combiner circuit for combining the two mixer outputs to produce a QPSK modulated microwave subcarrier signal. An optical modulator modulates the QPSK modulated microwave subcarrier signal onto an optical carrier signal, an optical detector detects the modulated subcarrier from the optical carrier signal to produce a detected subcarrier signal, and a QPSK demodulator recovers $S_0(t)$ and $S_1(t)$ from the detected subcarrier signal.

37 Claims, 9 Drawing Sheets

| φ | $d_1$ | $d_0$ |
|---|---|---|
| 135° | 0 | 0 |
| 225° | 1 | 0 |
| 45° | 0 | 1 |
| 315° | 1 | 1 | x(1,0)   x(1,1)

x(0,0)   x(0,1)

| LOGIC LEVELS | | DIFFERENTIAL PHASE $\Delta\phi$ | VOLTAGE OUTPUT | |
|---|---|---|---|---|
| $S_0$ | $S_1$ | | $\cos[\Delta\phi-45°]$ | $\cos[\Delta\phi+45°]$ |
| 0 | 0 | 180° | − | − |
| 0 | 1 | 270° | − | + |
| 1 | 0 | 90° | + | − |
| 1 | 1 | 0° | + | + |

*FIG. 6*

| $S_0$ | $S_1$ | $d'_0$ | $d'_1$ | $d_0$ | $d_1$ |
|---|---|---|---|---|---|
| 0 | 0 | 0 | 0 | 1 | 1 |
| 0 | 0 | 0 | 1 | 1 | 0 |
| 0 | 0 | 1 | 0 | 0 | 1 |
| 0 | 0 | 1 | 1 | 0 | 0 |
| 0 | 1 | 0 | 0 | 1 | 0 |
| 0 | 1 | 0 | 1 | 0 | 0 |
| 0 | 1 | 1 | 0 | 1 | 1 |
| 0 | 1 | 1 | 1 | 0 | 1 |
| 1 | 0 | 0 | 0 | 0 | 1 |
| 1 | 0 | 0 | 1 | 1 | 1 |
| 1 | 0 | 1 | 0 | 0 | 0 |
| 1 | 0 | 1 | 1 | 1 | 0 |
| 1 | 1 | 0 | 0 | 0 | 0 |
| 1 | 1 | 0 | 1 | 0 | 1 |
| 1 | 1 | 1 | 0 | 1 | 0 |
| 1 | 1 | 1 | 1 | 1 | 1 |

FIG. 7

DIFFERENTIAL QUADRATURE PHASE SHIFT KEYING ENCODER FOR SUBCARRIER SYSTEMS

BACKGROUND OF THE INVENTION

This invention relates to modulation techniques for transmitting information over fiber optic links.

In digital communications systems, bandwidth efficient modulation techniques are used to maximize the amount of information, in the form of digital voice, video and data channels, transmitted across a medium such as a fiber optic link. They do so by reducing the spectral bandwidth required for the transmission of each such digital data channel.

Some bandwidth efficient modulation techniques involve encoding two or more data bits in each information symbol transmitted across the digital communications link, instead of the familiar single bit binary code. The number of bits encoded by each symbol, and hence the number of possible bit patterns, determines the number of transmission states, or levels, possible for the symbol to take. A four-level code, where each transmitted symbol represents one of four possible symbol states, effectively encodes each of the four possible patterns for a pair of data bits in each transmitted symbol.

One technique for transmitting a pair of data bits with a four-level code is quadrature phase shift keying (QPSK) modulation, where each pair of bits is encoded during each symbol period as one of four possible phases of a transmitted carrier signal. Where each pair of bits is derived sequentially from the same data stream, the bit period for the data stream is one half the symbol period of the resulting QPSK signal. However, where each pair of bits is derived from two parallel data streams, the bit period for each data stream is equal to the symbol period of the resulting QPSK signal.

A technique related to QPSK modulation is differential QPSK (DQPSK) modulation, where each pair of data bits is encoded as one of four possible changes of phase of a transmitted carrier signal. Often, a differential QPSK demodulator for recovering the data bits from the transmitted carrier signal requires circuitry to perform an inverse tangent operation ($\tan^{-1}$), a data bit synchronization operation, and a four-level logical decision, all operating at data rates up to and beyond 200 Mb/sec.

In optical fiber communications systems, optical fiber transmission links typically rely on an optical modulator to modulate a laser light source with the information to be transmitted across the fiber. One type of optical modulator phase modulates the laser light source with one or more microwave subcarrier signals, each itself modulated with digital information. An optical heterodyne detector and subcarrier demodulator at the receiver end of the optical link detects the digital information from each of the modulated subcarrier channels.

SUMMARY OF THE INVENTION

In general, in one aspect, this invention features a differential QPSK digital communications apparatus and method, suitable for optical communications systems, where a pair of synchronous binary input data streams $S_0(t)$ and $S_1(t)$ are encoded into a pair of encoded binary data streams $d_0(t)$ and $d_1(t)$ which QPSK modulate the phase $\phi(t)$ of a carrier signal so that $\cos\{\Delta\phi - 45°\} > 0$ for $S_0(t) = 1$, $\cos\{\Delta\phi - 45°\} < 0$ for $S_0(t) = 0$, $\cos\{\Delta\phi + 45°\} > 0$ for $S_1(t) = 1$, and $\cos\{\Delta\phi + 45°\} < 0$ for $S_1(t) = 0$ where $\Delta\phi = \phi(t) - \phi(t-T)$, and T is the single data symbol interval.

Preferred embodiments include an encoder for encoding $d_0(t)$ and $d_1(t)$ to satisfy the logical relationships $d_0(t) = \overline{S_0(t)} \, \overline{S_1(t)} \, \overline{d_0(t-T)} + \overline{S_0(t)} \, S_1(t)$
$\quad d_1(t-T) + S_0(t) \, \overline{S_1(t)} \, d_1(t-T) + S_0(t) \, S_1(t) \, d_0(t-T)$ and, $d_1(t) = \overline{S_0(t)} \, \overline{S_1(t)} \, \overline{d_1(t-T)} + \overline{S_0(t)} \, S_1(t)$
$\quad d_0(t-T) + S_0(t) \, \overline{S_1(t)} \, \overline{d_0(t-T)} + S_0(t) \, S_1(t) \, d_1(t-T).$ The encoder features time delay circuits for delaying $d_0(t)$ and $d_1(t)$ by a period T to produce $d_0(t-T)$ and $d_1(t-T)$ respectively. A logic circuit produces $d_0(t)$ and $d_1(t)$ from $S_0(t)$, $S_1(t)$, $d_0(t-T)$ and $d_1(t-T)$ according to these logical relationships.

In another preferred embodiment the carrier signal is a microwave subcarrier modulated by a microwave QPSK subcarrier modulator. The microwave QPSK subcarrier modulator includes an in-phase and quadrature subcarrier signal source, a mixer for mixing the in-phase subcarrier with $d_0(t)$, a second mixer for mixing the quadrature subcarrier with $d_1(t)$, and a combiner circuit for combining the two mixer outputs to produce a QPSK modulated microwave subcarrier signal.

Other preferred embodiments includes an optical modulator for modulating the QPSK modulated microwave subcarrier signal onto an optical carrier signal, an optical detector for detecting the modulated subcarrier from the optical carrier signal to produce a detected subcarrier signal, and a QPSK demodulator for recovering $S_0(t)$ and $S_1(t)$ from the detected subcarrier signal. Preferred embodiments of the QPSK demodulator include a phase delay network for delaying the phase of the detected subcarrier by a predetermined phase delay to produce a phase-delayed detected subcarrier, a phase advance network for advancing the phase of the detected subcarrier by a predetermined phase advance and produce a phase-advanced detected subcarrier, a time delay circuit for delaying the detected subcarrier by time period T to provide a time-delayed detected subcarrier, a mixer for mixing the phase-delayed detected subcarrier with the time-delayed detected subcarrier to produce an output representing $S_0(t)$, and another mixer for mixing the phase-advanced detected subcarrier with the time-delayed detected subcarrier to produce an output representing $S_1(t)$.

In general, in another aspect, the invention features a subcarrier multiplexed differential QPSK digital communications apparatus and method for encoding multiple pairs of synchronous binary input data streams $S_{m,0}(t)$, $S_{m,1}(t)$, where m is the index number of the data stream pair, into an associated pair of encoded binary data streams $d_{m,0}(t)$, $d_{m,1}(t)$, and QPSK modulating the phase $\phi_m(t)$ of an associated microwave subcarrier signal at frequency $f_m$ with the encoded logical values of $d_{m,0}(t)$ and $d_{m,1}(t)$ so that $\cos\{\Delta\phi_m - 45°\} > 0$ for $S_{m,0}(t) = 1$, $\cos\{\Delta\phi_m - 45°\} < 0$ for $S_{m,0}(t) = 0$, $\cos\{\Delta\phi_m + 45°\} > 0$ for $S_{m,1}(t) = 1$, and $\cos\{\Delta\phi_m + 45°\} < 0$ for $S_{m,1}(t) = 0$ where $\Delta\phi_m = \phi_m(t) - \phi_m(t - T)$, and T is the single data symbol interval.

The invention thus features a QPSK modulation technique for digital communications systems that provides bandwidth efficiency, uses simple modulation and demodulation circuitry, has good receiver sensitivity, and is applicable to digital communication systems in general, and to both heterodyne and intensity modulated/direct detection optical systems in particular.

The invention also provides an optical heterodyne subcarrier multiplexed quadrature phase shift keyed (SCM-QPSK) data communications system that uses a differential data encoding scheme to modulate two independent digital data streams onto a single subcarrier, and that requires only a simple delay and multiply QPSK demodulator to decode the data at the optical receiver, thereby considerably reducing the complexity of the optical receiver and demodulator. No carrier recovery circuit (CRC), typically requiring high frequency signal processing at four times the data rate, or phase-locked loop circuit is required in the QPSK demodulator of this invention. Also, no demultiplexing or 4-level decision circuit is required either, since the QPSK demodulator decodes the data streams in parallel.

A heterodyne SCM-QPSK fiber optic system featuring ten 50 Mb/sec video channels and using the differential data encoding and the QPSK modulation and demodulation of this invention is described. The electronic circuits for encoding the data for QPSK modulation are produced from commercially available ECL 100 devices and is data rate agile, accepting data rates from DC to over 200 Mb/sec. Using the simple delay and multiply QPSK demodulator of this invention, a receiver sensitivity of −41 dBm has been obtained at a data rate of 50 Mb/s/channel.

Other advantages and features will become apparent from the following description of the preferred embodiment and from the claims.

DESCRIPTION OF THE PREFERRED EMBODIMENTS

We first briefly describe the drawings.

FIG. 1 is a schematic diagram of the differential QPSK encoder and microwave subcarrier modulator of this invention;

FIG. 2(a) and 2(b) are a phase plot and a table of values, respectively, showing the relationship between pairs of encoded data bits and the phase of the differential QPSK modulated subcarrier produced by the subcarrier modulator of FIG. 1;

FIG. 6 is a table showing the data bit encoded subcarrier differential phase shift $\Delta\phi$ and the resulting output voltage polarity for the demodulator of FIG. 4;

FIG. 7 is a truth table showing the logical relationship between the input data streams $S_0$ and $S_1$, the one bit time delayed encoded data $d'_0$ and $d'_1$, and the output encoded data streams $d_0$ and $d_1$ for the differential QPSK encoder of FIG. 1;

Figure 1:
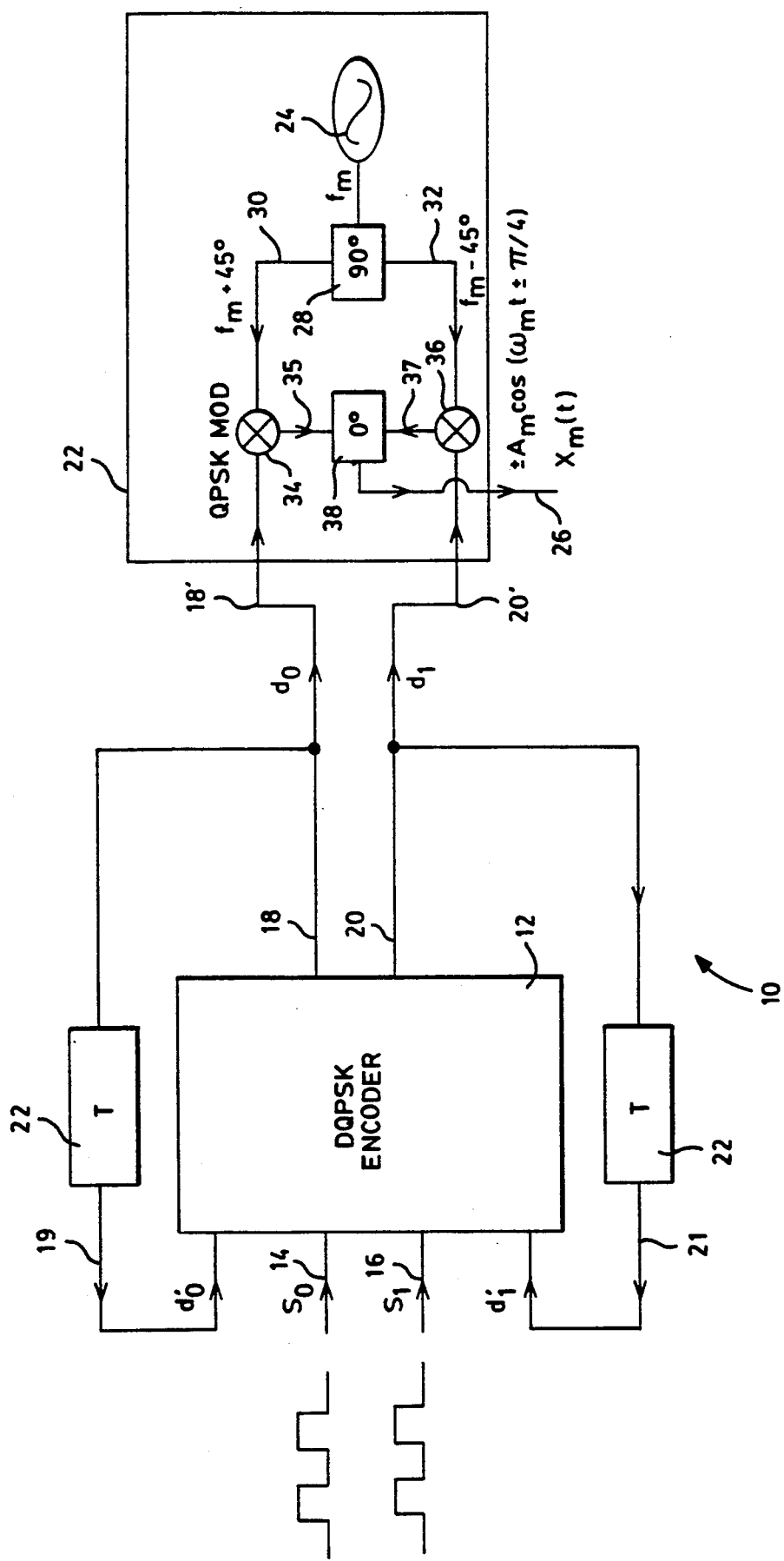

Referring now to FIG. 1, in a subcarrier modulator 10 for an optical communications system, a differential quadrature phase shift keying (DQPSK) encoder 12 accepts two independent parallel baseband data streams $S_0$ and $S_1$ on encoder input lines 14 and 16 respectively. DQPSK encoder 12 encodes data streams $S_0$ and $S_1$ to produce two encoded data streams $d_0$ and $d_1$ on DQPSK encoder output lines 18 and 20, respectively. The logical states of the encoded data streams $d_0$ and $d_1$ during any single data symbol interval (i.e., the present symbol interval) are determined by a logical combination of the logical states of encoder input data streams $S_0$ and $S_1$ during the same symbol interval, and the logical states of $d_0$ and $d_1$ during the previous symbol interval represented by $d'_0$ and $d'_1$, respectively. To implement this logical combination, the encoded data stream $d_0$ and $d_1$ are each sent through an identical time delay circuit 22 which delays each data stream by a single data symbol interval T to produce the $d'_0$ and $d'_1$ delayed data streams on lines 19 and 21, respectively, for input to DQPSK encoder 12. Denoting the logical values of the encoded data stream bits at time t as $d_0(t)$ and $d_1(t)$, then the delayed data stream bits $d'_0(t)$ and $d'_1(t)$ that are fed back to the encoder at time t are given by $$d'_0(t) = d_0(t - T) \tag{1}$$

and, $$d'_1(t) = d_1(t - T)$$

where T is the symbol period.

Figures 2A, 2B:
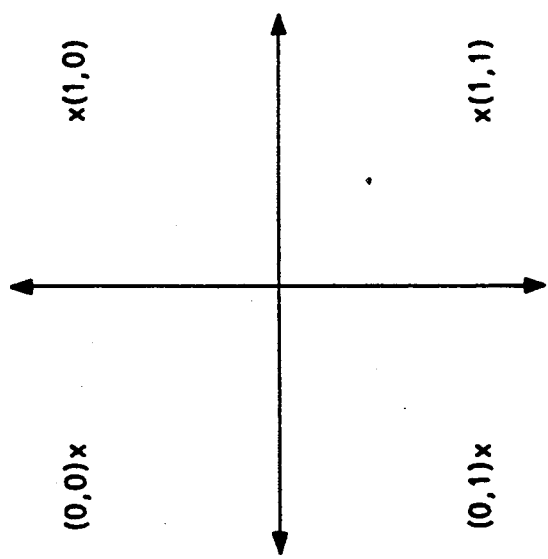

The DQPSK encoded data streams $d_0$ and $d_1$ are applied to the input lines 18' and 20' of a QPSK modulator 22 that modulates a microwave subcarrier of frequency $f_m$ to produce a QPSK output signal on line 26. Microwave subcarrier signal source 24 generates a subcarrier signal at $f_m$ which is fed through a phase shift network 28 to produce a quadrature pair of subcarrier signals at $f_m + 45°$ on line 30 and $f_m - 45°$ on line 32, which are phase shifted versions of the subcarrier signal at $f_m$, 90° out of phase with each other. Mixer 34 modulates data stream $d_0$ onto the subcarrier at $f_m + 45°$, and mixer 36 modulates data stream $d_1$ onto the subcarrier at $f_m - 45°$. The output of mixer 34 on line 35 and the output of mixer 36 on line 37 are combined by network 38 to produce a QPSK modulated subcarrier output signal $x_m(t)$ on line 26, which is given by $$x_m(t) = A_m \cos(2\pi f_m + \phi_m) \qquad (2)$$

where $A_m$ is the amplitude of the modulated subcarrier, $f_m$ is the microwave frequency of the modulated subcarrier, and $\phi_m$ is the phase of the modulated subcarrier relative to the subcarrier generated by microwave subcarrier signal source 24. It follows that the modulated subcarrier phase $\phi$ can only take on the values of 45°, 135°, 225°, and 315°, dependent on the logical states of the encoded data streams $d_0$ and $d_1$. FIGS. 2(a) and 2(b) show the relationship between $\phi$ and the encoded data streams ($d_0, d_1$).

Figure 3:
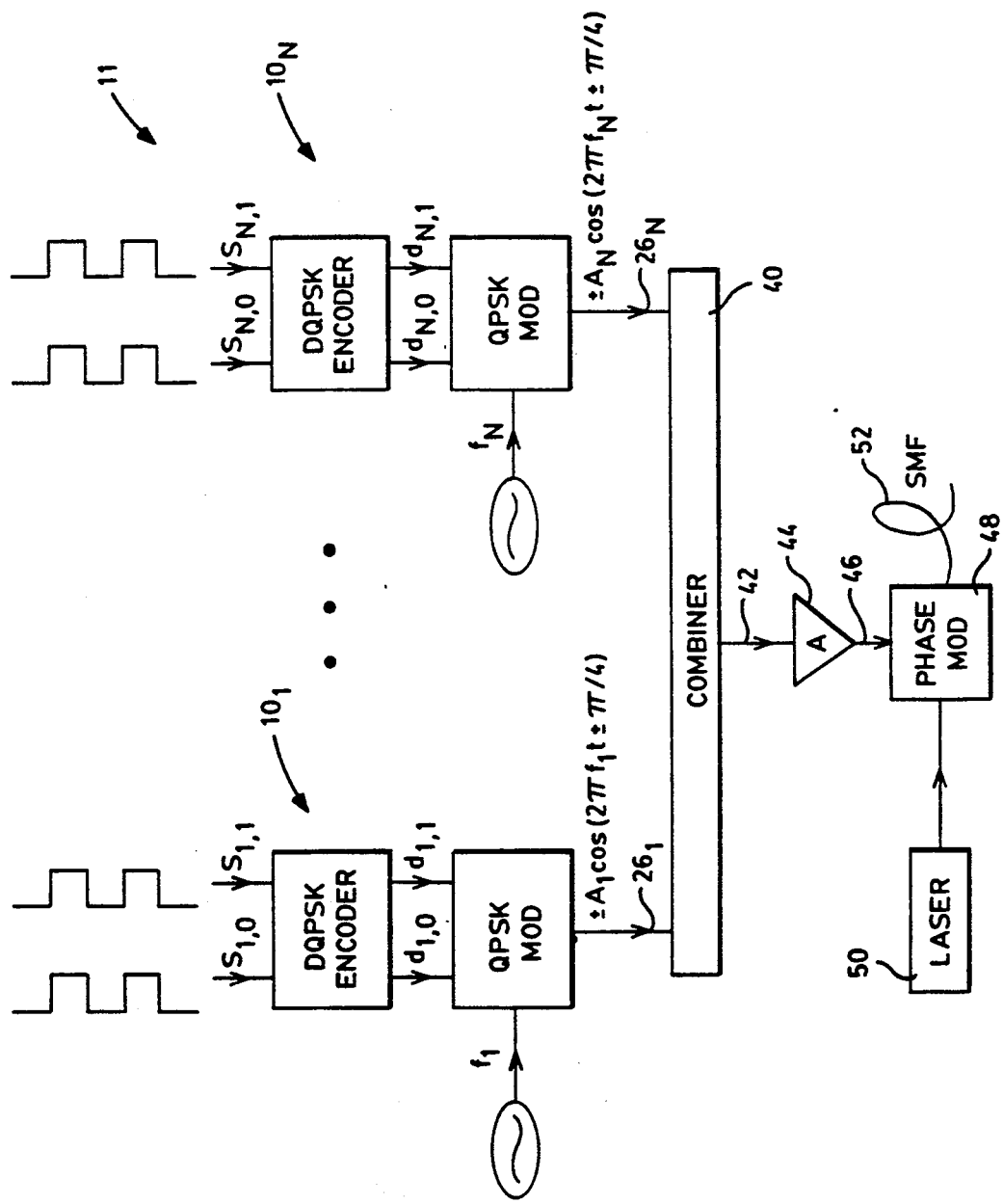
FIG. 3 is a schematic diagram of an optical modulator for modulating multiple microwave subcarrier channels on a laser light carrier signal featuring the differential QPSK encoder and microwave subcarrier modulator of FIG. 1 for modulating each subcarrier channel with digital information.

Referring to FIG. 3, an electro-optical modulator 11 for modulating an optical carrier signal with numerous electrical subcarrier data channels has a quantity N of QPSK subcarrier modulators $10_1$ through $10_N$, and except for subcarrier frequency, each modulator is substantially the same as QPSK subcarrier modulator 10 of FIG. I. Subcarrier modulators $10_1$ through $10_N$ each accept a pair of independent input data streams $S_{1,0}$, $S_{1,1}$ through $S_{N,0}$, $S_{N,1}$ respectively, to modulate a total of 2N independent data channels. Modulators $10_1$ through $10_N$ each modulate their respective input data streams onto a different frequency subcarrier, having subcarrier frequencies $f_1$ through $f_N$, to produce QPSK modulated subcarriers on lines $26_1$ through $26_N$, respectively. The modulated subcarriers on lines $26_1$ through $26_N$ are combined by a microwave power combiner 40 to produce a composite subcarrier modulated QPSK signal (SCM-QPSK) on line 42 containing N independent subcarriers modulated with 2N independent data channels. The composite SCM-QPSK signal on line 42 is amplified by microwave amplifier 44, and the output of the amplifier on line 46 drives an optical phase modulator 48. Optical phase modulator 48 modulates the phase of an optical carrier, generated by a laser 50, with the composite SCM-QPSK signal, and the phase modulated optical carrier is injected into a single mode fiber (SMF) optical communications link 52.

Figure 4:
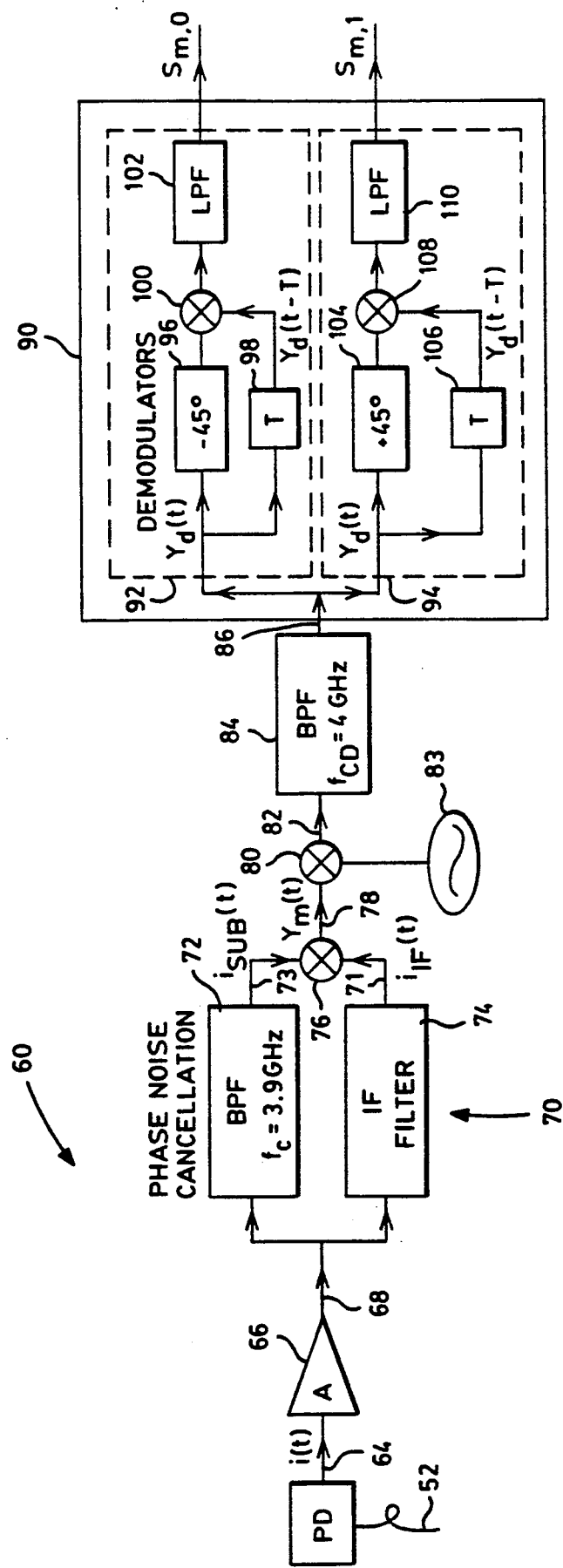
FIG. 4 is a schematic diagram of an optical heterodyne receiver, employing a phase noise cancellation circuit and a delay and multiply demodulator, for receiving and decoding a differential QPSK encoded subcarrier modulated by the optical modulator of FIG. 3.

Referring to FIG. 4, an optical receiver 60 receives the composite SCM-QPSK modulated optical carrier transmitted along SMF communications link 52 and detects a single QPSK modulated subcarrier channel from the composite optical carrier, the detected subcarrier having an original subcarrier frequency $f_m$ where m is an integer from 1 to N. A differential QPSK demodulator 90 in turn recovers independent data streams $S_0$ and $S_1$ (i.e., $S_{m,0}$ and $S_{m,1}$) from the detected subcarrier.

Specifically, the composite SCM-QPSK modulated optical carrier signal received over SMF communications link 52 is heterodyned with the output of a tunable light frequency local oscillator (LO) laser 56. The optical signals are then detected by a PIN photodiode detector (PD) 62 which performs the function of an optical mixer and produces a photocurrent i(t) on detector output line 64, which is amplified by a microwave amplifier 66, and then input on line 68 through a phase noise cancellation circuit (PNC) 70.

Figure 5:
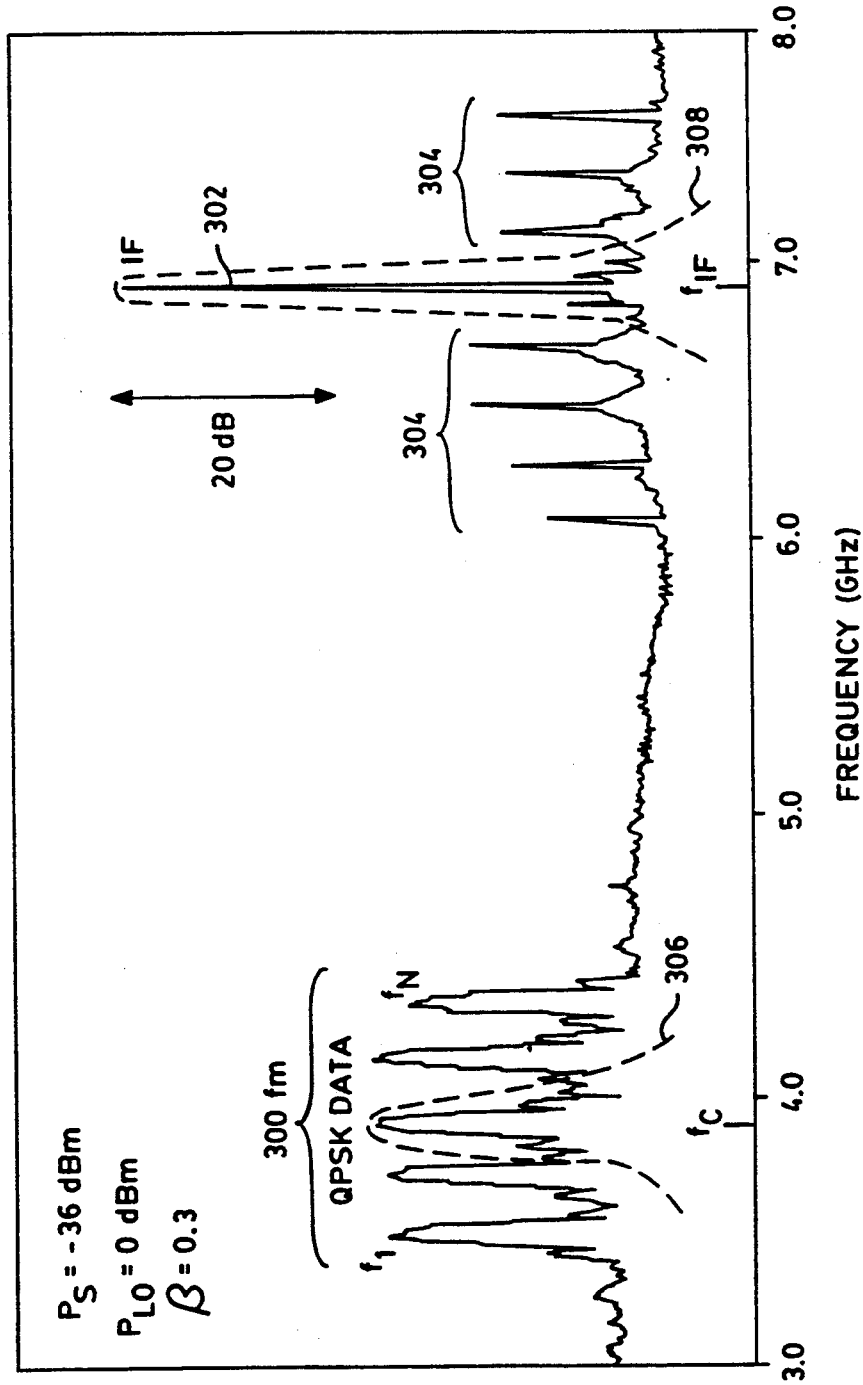
FIG. 5 is a plot of the frequency spectrum of the differential QPSK modulated subcarrier channels after mixing with the laser local oscillator of the optical heterodyne receiver of FIG. 4.

Referring to FIG. 5, optical mixer 54 has the effect of translating the frequency spectrum of the composite SCM-QPSK modulation from the vicinity of the optical carrier frequency into the microwave frequency range. The resulting photocurrent i(t) output from PD 62 represents the composite SCM-QPSK signal spectrum 300 superimposed on a carrier 302 at a microwave intermediate frequency $f_{IF}$ equal to the difference between the transmitter laser frequency $f_t$ and the LO laser frequency $f_{LO}$, i.e., $f_{IF} = f_t - f_{LO}$. The LO laser frequency $f_{LO}$ is tunable With respect to the transmitted laser frequency $f_t$ resulting in an IF carrier frequency $f_{IF}$ tunable over a 6.5 GHz to 7.3 GHz range. FIG. 5 shows an example of an SCM-QPSK spectrum having an IF carrier frequency $f_{IF}$ signal located at 6.9 GHz and the QPSK subcarriers in the 2.6 GHz to 3.4 GHz frequency range at $(f_{IF} - f_m)$, where $f_m$ are the original subcarrier frequencies, i.e., m is an integer from 1 to N. The additional terms 304 around $f_{IF}$ are second order intermodulation products generated by optical mixer 54.

Referring again also to FIG. 4, the amplified photocurrent i(t) on line 68 is input to PNC circuit 70 which has a microwave bandpass filter 72, having a frequency response 306 (FIG. 5) with a center frequency $f_c = 3.9$ GHz and a bandwidth of approximately 150 MHz, in parallel with an intermediate frequency (IF) filter 74, having a frequency response 308 (FIG. 5) with a center frequency $f_{cIF} = 7.0$ GHz and a bandwidth of approximately 2.0 GHz. A detailed analysis of a similar optical phase noise cancellation circuit is described in Gross, R. et al., "Coherent FM-SCM System Using DFB Lasers and a Phase Noise Cancellation Circuit", IEEE Photonics Technology Letters, Vol. 2, No. 1, January 1990, which is incorporated herein by reference.

Demodulating the data from a desired QPSK modulated subcarrier channel first requires tuning the light frequency $f_{LO}$ of the laser LO 56 so that the desired subcarrier channel at $f_m$ is frequency translated to the bandpass filter 72 center frequency $f_c 32$ 3.9 GHz, i.e., $f_c = f_{IF} - f_m = 3.9$ GHz. The desired QPSK subcarrier channel centered at $f_c$ passes through the 3.9 GHz bandpass filter 72 and is output on line 73, while the other QPSK subcarrier channels are rejected. The parallel IF filter 74 of PNC circuit 70 provides a filtered IF signal at $f_{IF}$ on line 71 which is mixed, by a double balanced mixer 76, with the desired QPSK subcarrier channel at $f_c$ on line 73, to produce a PNC circuit output signal $y_m(t)$ on line 78. The mixing action of mixer 76 translates the desired QPSK subcarrier channel at $f_c$ back to its original subcarrier frequency $f_m$, and also works to cancel optical phase noise on $y_m(t)$ so that $y_m(t)$ is substantially the original QPSK modulated microwave subcarrier signal at $f_m$. The PNC circuit also provides the function of a very precise automatic frequency control loop.

Mathematically, photocurrent i(t) is given by $$i(t) = 2\sqrt{I_s I_{LO}} \cos\{2\pi f_{IF} t + \theta_N(t) + \Delta\rho(t)\} + n(t) \qquad (3)$$

and, $$\theta_N(t) = \sum_{m=1}^{N} \beta_m \cos\{2\pi f_m t + \phi_m\} \qquad (4)$$

where $I_s$ and $I_{LO}$ are the signal and LO laser photocurrent outputs, respectively, $\theta_N$ is the composite SCM-QPSK microwave signal having N subcarriers, $\Delta\rho(t)$ is the phase noise, n(t) is other system noise, and, $\beta_m$ is the modulation index for the $m^{th}$ subcarrier channel. $\beta_m$ is typically determined by the amplitude of the microwave subcarrier signal and the response of the associated optical phase modulator. Equations (3) and (4) can be expanded in a series of Bessel functions to identify the intermediate frequency photocurrent $i_{IF}(t)$ signal at the output of IF filter 70 on line 71, and subcarrier photocurrent $i_{sub}(t)$ signal at the output of BPF 72 on line 73. These photocurrent signals are given by $$i_{IF}(t) = 2\sqrt{I_S I_{LO}} \ [J_0(\beta_m)]^N \cos\{2\pi f_{IF} t + \Delta\rho(t)\} \quad (5)$$

and, $$i_{sub}(t) = 2\sqrt{I_S I_{LO}} \ J_1(\beta_m) [J_0(\beta_m)]^{N-1} \times \quad (6)$$
$$\cos\{2\pi[f_{IF} - f_m]t - \phi_m + \Delta\rho(t)\}$$

where $J_0(\beta_m)$ and $J_1(\beta_m)$ denote zero and first order Bessel functions respectively. The expression for the subcarrier photocurrent $i_{sub}(t)$ include only the term in the first order lower sideband, which passes through the BPF. PNC output $y_m(t)$ on line 78 can be shown to be, within an amplitude proportionality constant, the original QPSK modulated subcarrier signal at $f_m$, and is given by $$y_m(t) = 2\gamma \sqrt{I_S I_{LO}} \ J_1(\beta_m) [J_0(\beta_m)]^{N-1} \cos\{2\pi f_m t + \phi_m\} \quad (7)$$

where $\gamma$ is a constant reflecting the reduction in amplitude of the signal due to the mixing process. The amplitude of the noise term $n(t)$ from eq. (3) is correspondingly affected by the mixing process, so no change in the carrier-to-noise ratio (CNR) is observed. The CNR for a particular subcarrier in the heterodyne SCM-QPSK system is given by $$CNR = \frac{2 \ I_S I_{LO} \ J_1^2(\beta_m)[J_0(\beta_m)]^{2N-2}}{\sigma_{sh}^2 + \sigma_{th}^2 + \sigma_{imd}^2 + \sigma_{xt}^2} \quad (8)$$

where $\sigma_{sh}^2$ represents the shot noise, $\sigma_{th}^2$ represents thermal noise, $\sigma_{imd}^2$ represents the intermodulation distortion (IMD), and $\sigma_{xt}^2$ represents the crosstalk due to adjacent subcarrier channel interference. The crosstalk in this case is negligible due to the relatively large spacing between microwave subcarriers accommodated by the optical carrier.

Still referring to FIG. 4, PNC circuit output $y_m(t)$ on line 78 is then frequency translated from $f_m$ to $f_d=4.0$ GHz by a microwave mixer 80 driven by a microwave oscillator 83, so that QPSK demodulator 90 always sees a subcarrier signal at the same frequency $f_d$ regardless of which subcarrier channel is selected. The mixer output on line 82 passes through a bandpass filter 84, having a center frequency $f_{cd}$ of 4.0 GHz, which removes any unwanted terms produced by the PNC circuit and the frequency translation mixer 80 to produce the desired QPSK modulated subcarrier signal $y_d(t)$ at $f_d$ on line 86.

Now with respect to QPSK demodulator 90, the desired QPSK modulated subcarrier signal $y_d(t)$ on line 86 drives the input to QPSK demodulator 90 which recovers data streams $S_{m,0}$ and $S_{m,1}$ hereafter referred to as $S_0$ and $S_1$, from the $y_d(t)$ signal by first power dividing $y_d(t)$ between two demodulator signal paths 92 and 94. The $y_d(t)$ signal in each demodulator signal path is phase shifted by 45° in opposite directions, i.e., +45° for path 94 and −45° for path 92, and then multiplied by $y_d(t-T)$, a one-bit time delayed version of $y_d(t)$. The resulting 90° total phase shift between the signals in the two demodulator paths allows extraction of the information in the in-phase or quadrature component of the $y_d(t)$ QPSK signal. Specifically, QPSK signal $y_d(t)$ in demodulator signal path 92 is shifted −45° by a phase shift network 96, and in parallel, is delayed T seconds (i.e., one symbol period) by time delay 98 to produce $y_d(t-T)$. The output of phase shift network 96 and time delay 98 are multiplied by a mixer 100, the output of which passes through a low pass filter (LPF) 102 to produce data stream $S_0$. The low pass filter eliminates the high frequency signal terms produced by the mixer and removes out of band noise. In parallel, QPSK signal $y_d(t)$ in demodulator signal path 94 is shifted +45° by a phase shift network 104, and in parallel, is delayed T seconds (i.e., one symbol period) by time delay 106. The outputs of phase shift network 104 and time delay 106 are multiplied by a mixer 108, the output of which passes through a LPF 110 to produce data stream $S_1$.

The relative time delay $\tau$ that produces the 45° phase shift in $y_d(t)$ at the outputs of phase shift networks 96, 104 must be small compared to the symbol period T to insure that the correlation timing in the demodulator is not disturbed. Relative time delay $\tau$ is determined by the relationship $2\pi f_d \tau = \pi/4$. Where $f_d = 4.0$ GHz as described, $\tau$ is approximately 30 picoseconds, which is very small compared to a single symbol period T of, for instance, 20 nanoseconds for a 50 Mb/sec data stream, i.e., $S_0$ or $S_1$.

Applying trigonometric identities to the signals multiplied by mixers 100 and 108, i.e., $y_d(t) \cdot y_d(t-T)$, and noting that frequency $f_d$ and symbol period T are chosen so that $f_d T$ is an integer, the output voltages of LPFs 102 and 108, representing data streams $S_0(t)$ and $S_1(t)$, respectively, are of the form $$S_0(t) = \cos\{\Delta\phi - 45°\} \quad (9)$$

and $$S_1(t) = \cos\{\Delta\phi + 45°\}$$

where $\Delta\phi = \phi(t) - \phi(t-T)$ is the difference between the subcarrier modulated phase $\phi$ assigned for consecutive encoded data bits $d_0(t)$ and $d_0(t-T)$, and, $d_1(t)$ and $d_1(t-T)$. Constrained by the values of $\phi$ listed in FIG. 2(b) for $d_0$ and $d_1$, $\Delta\phi$ may only take on the values of 0°, 90°, 180°, or 270°. Thus, by properly encoding the input data streams $S_0(t)$ and $S_1(t)$ into encoded data streams $d_0(t)$ and $d_1(t)$ that store the information in the input data streams as the difference in the phase $\Delta\phi$ of consecutive bits the two demodulator signal paths 92 and 94 respectively reproduce the original data streams $S_0(t)$ and $S_1(t)$ in parallel.

Now, with respect to the proper encoding of input data streams $S_0$ and $S_1$ by DQPSK encoder 10 (FIG. 1) so that demodulator 90 (FIG. 4) may recover these data streams as described, the relationship between $S_0$, $S_1$, and $\Delta\phi$ is considered first. FIG. 6 shows the relationship between the logic levels of data streams $S_0$ and $S_1$, and the differential phase shift $\Delta\phi$. Assigning a positive (+) voltage level to correspond to a "high" logic level, and a negative (−) voltage level to correspond to a "low" logic level, the mathematical expression for the differential phase shift $\Delta\phi$ can be written as $$\Delta\phi = \frac{-\pi}{4} + S_0\left(\frac{\pi}{2} - S_1\frac{\pi}{4}\right) \quad (10)$$

One can verify by substitution from eq.(10) and FIG. 6 that this assignment will reproduce the original data streams $S_0$ and $S_1$.

To produce the correct differential phase shift $\Delta\phi$ for the present values of $S_0$ and $S_1$, the phase value assigned to the previous symbol period is also considered. This information is provided by feeding back the one symbol period time-delayed encoded information $d'_0$ and $d'_1$ (FIG. 1). FIG. 5 shows the truth table for encoding the encoder output bits $d_0$ and $d_1$ as a function of the input bits $S_0$ and $S_1$, and the previous symbol period encoded bits $d'_0$ and $d'_1$. Applying Boolean algebra to solve for output bits $d_0$ and $d_1$, the logical equations to implement the encoding are given by $$d_0 = \overline{S_0}\overline{S_1}\overline{d'_0} + \overline{S_0}S_1\overline{d'_1} + S_0\overline{S_1}d'_1 + S_0S_1d'_0 \quad (11)$$

and, $$d_1 = \overline{S_0}\overline{S_1}\overline{d'_1} + \overline{S_0}S_1d'_0 + S_0\overline{S_1}\overline{d'_0} + S_0S_1d'_1 \quad (12)$$

where the bar above the symbol indicates a logical inversion.

Referring to FIG. 7, an electrical circuit 200 for implementing the DQPSK encoder 10 of FIG. 1, and whose function is discussed above, uses commercially available ECL 100 series integrated circuits (available from Signetics Corp., 811 E. Arques Ave., Sunnyvale, Calif. 94088) IC 202, IC 204 and IC 206. Input data streams $S_0$ and $S_1$ are input to IC 202, a 4 to 1 multiplexer (ECL F100171). The $d_0$ and $d_1$ multiplexer outputs from IC 202 are input to IC 204, a clocked D-flip flop (ECL F100131). The outputs of the clocked D-flip flop IC 204, $d'_0$ and $d'_1$ are fed back as inputs to multiplexer IC 202. The encoded data outputs $d_0$ and $d_1$ are also input to IC 206, a driver/buffer (ECL F100112), whose output drives the QPSK modulator 22 of FIG. 1.

An important feature of encoder circuit 200 is that it is data rate flexible. The circuit can operate from DC to about 200 Mb/s, where the maximum data rate is a result of the speed limitations of the silicon integrated circuits. With gallium arsenide (GaAs) technology, the encoder is capable of operation in the Gb/s region.

EXPERIMENTAL RESULTS

A system experiment was performed using a 5 channel SCM-QPSK microwave signal modulated onto an optical carrier, i.e., N=5. Each of the 5 microwave subcarrier channels was QPSK modulated with two independent 50 Mb/sec data streams $S_0$ and $S_1$, for an aggregate data rate of 500 Mb/sec for the single optical carrier. Five DQPSK encoder circuits 200 of FIG. 7 were constructed and tested by inputting the 50 Mb/s data streams $S_0$ and $S_1$ into each circuit. A subcarrier receiver 60 and QPSK demodulator 90 of FIG. 4 were used to receive and decode one of the QPSK modulated subcarriers, i.e., the desired QPSK modulated subcarrier. The optical modulator 11 of FIG. 4 was constructed for this experiment with each of the five DQPSK encoder circuits, now referred to as $10_1$ through $10_5$, feeding a corresponding QPSK modulator with subcarrier frequencies $f_m = 2.6, 2.8, 3.0, 3.2, 3.4$ GHz, respectively. A total of ten digital video channels were transmitted over the ten independent data streams $S_{1,0}$ through $S_{5,0}$, and $S_{1,1}$ through $S_{5,1}$, with each channel operating at 50 Mb/s. The phase modulator 48 is a travelling wave LiNbO$_3$ device with a bandwidth of 8 GHz and both the optical transmitter laser 50 and local oscillator (LO) laser 56 (FIG. 4) are diode pumped Nd YAG lasers with a combined linewidth on the order of 10 kHz. A 6 km single mode fiber communications link 52 was used.

Figure 8:
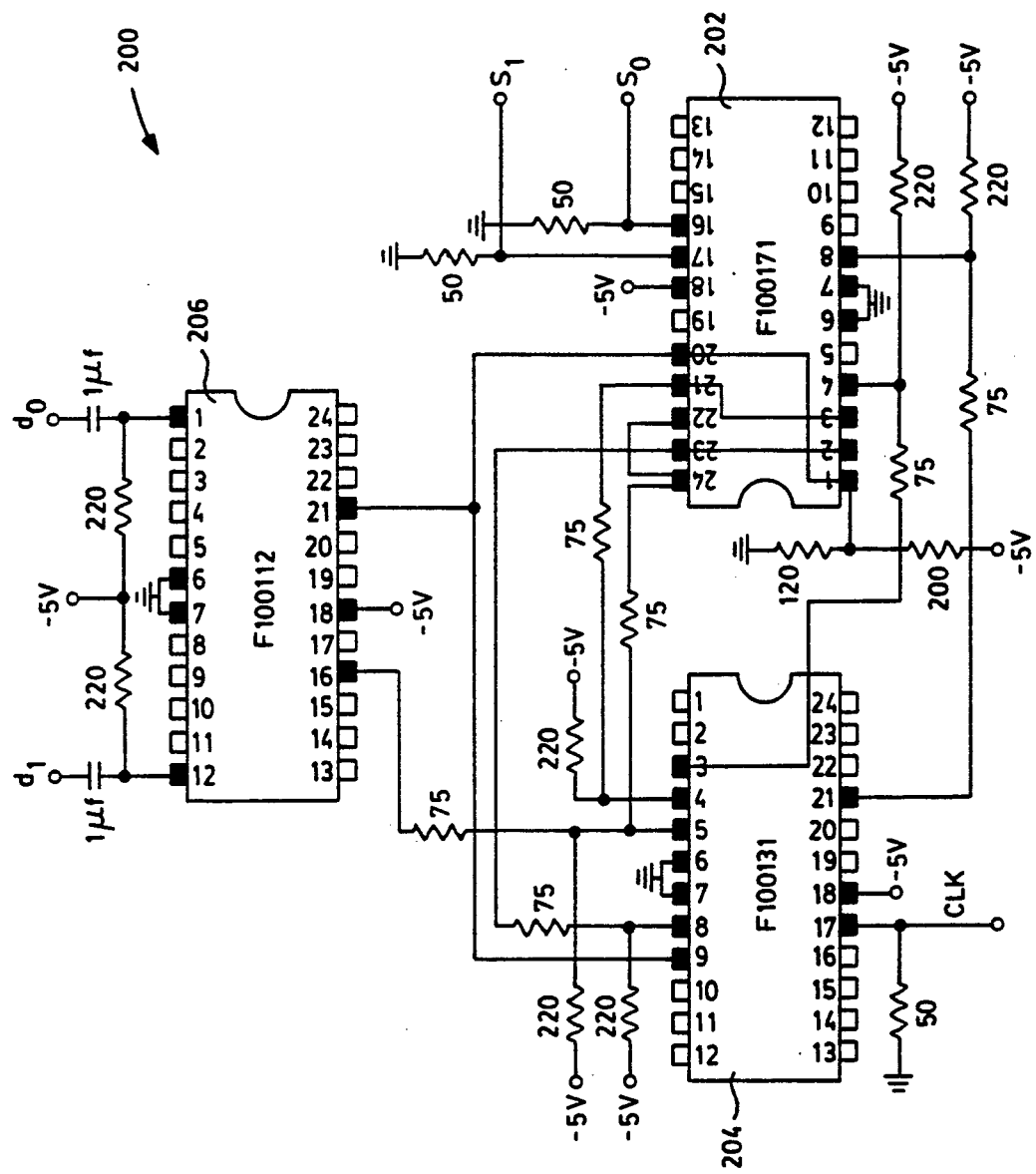
FIG. 8 is a schematic diagram of an electrical circuit for implementing the differential QPSK encoder of FIG. 1.
Figure 9:
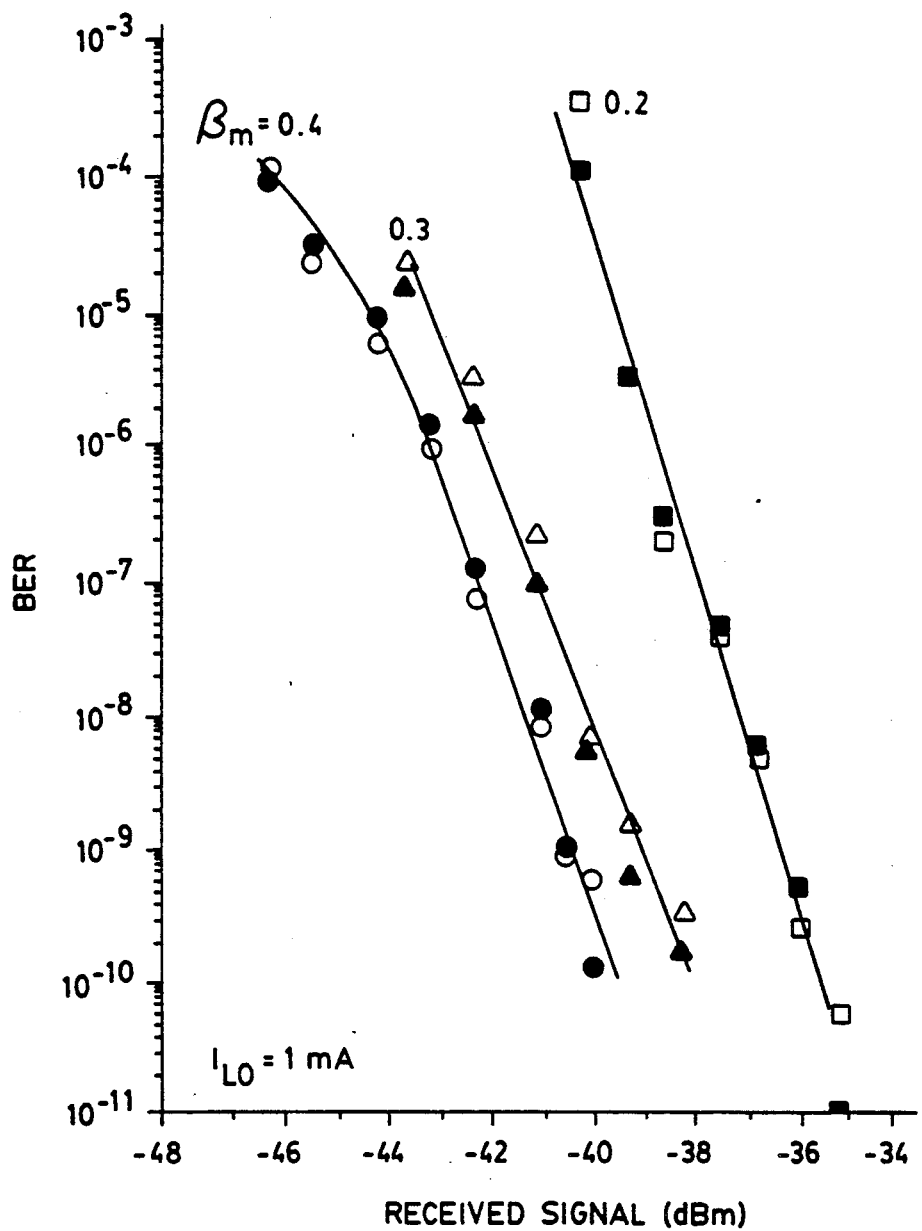
FIG. 9 is a plot of the measured bit error rate (BER) vs. received signal power for an experimental system employing the differential QPSK modulated subcarrier techniques of this invention.

FIG. 8 depicts the measured bit error rate (BER) performance of the experimental system described versus the detected optical power for three phase modulation indexes $\beta_m = 0.2, 0.3,$ and $0.4$. With an LO laser photocurrent of 1 mA, $\beta_m = 0.4$ is optimal for this system, which is shown by Gross, R., et al., "Multichannel Coherent FSK Experiments Using Subcarrier Multiplexing Techniques", IEEE Journal of Lightwave Technology, Vol. 8, No. 3, March 1990, which is incorporated herein by reference. Measurements were taken for the center subcarrier channel at $f_m = 3.0$ GHz, which is the worst case channel with respect to intermoculation distortion. Using a reference BER of $10^{-9}$, the receiver sensitivity of the system was measured to be $-36.5, -39,$ and $-41$ dBm, for phase modulation indexes of $\beta_m = 0.2, 0.3$ and $0.4$, respectively. The solid points represent measurements on the quadrature channel $S_1$ and the open points are from the in-phase channel $S_0$. The carrier to noise ratio (CNR) required to obtain a BER $= 10^{-9}$ was measured to be approximately 16 dB for all three cases.

The present invention has been described herein in connection with optical digital communications systems. It will be understood that the techniques described can also be applied other types of digital communications systems, either electrical or optical. For instance, the encoding and modulation techniques described may be applied to direct detection SCM optical systems, where the microwave signal modulates the intensity of a laser light carrier signal. Yet other applications may arise as video systems continue to evolve from analog to digital services.

Other embodiments are within the scope of the following claims.

What is claimed is:

1. An apparatus, comprising
   at least one encoder for encoding a pair of synchronous binary input data streams $S_0(t)$, $S_1(t)$, into a pair of encoded binary data streams $d_0(t)$, $d_1(t)$, each said input data stream having a single bit period T between successive data bits;
   said encoder further including a first time delay circuit for delaying $d_0(t)$ by a period T to produce a first time-delayed encoded signal $d_0(t-T)$;
   a second time delay circuit for delaying $d_1(t)$ by a period T to produce a second time-delayed encoded signal $d_1(t-T)$; and
   a logic circuit for producing encoded signals $d_0(t)$ and $d_1(t)$ from $S_0(t)$, $S_1(t)$, $d_0(t-T)$, and $d_1(t-T)$ according to the logical relationships:

$$d_0(t) = \overline{S_0}(t)\,\overline{S_1}(t)\,\overline{d_0(t-T)} + \overline{S_0}(t)\,S_1(t)\\ d_1(t-T) + S_0(t)\,\overline{S_1}(t)\,\overline{d_1(t-T)} + S_0(t)\,S_1(t)\,d_0(t-T)$$

and $$d_1(t) = \overline{S_0}(t)\,\overline{S_1}(t)\,\overline{d_1(t-T)} + \overline{S_0}(t)\,S_1(t)\\ d_0(t-T) + S_0(t)\,\overline{S_1}(t)\,d_1(t-T) + S_0(t)\,S_1(t)\,d_1(t-T);$$

at least one QPSK modulator for modulating with the encoded signals $d_0$ and $d_1$ the phase $\phi(t)$ of at least one carrier signal having a frequency f and an amplitude A, said modulated carrier signal being given by $$x(t) = A \cos(2\pi f t + \phi(t));$$

wherein said phase $\phi(t)$ is determined by the logical values of said encoded binary data streams $d_0(t)$ and $d_1(t)$, and said encoder encodes $d_0(t)$ and $d_1(t)$ to satisfy the relationships $$\cos\{\Delta\phi - 45°\} > 0 \text{ for } S_0(t) = 1,$$

$$\cos\{\Delta\phi - 45°\} < 0 \text{ for } S_0(t) = 0,$$

$$\cos\{\Delta\phi + 45°\} > 0 \text{ for } S_1(t) = 1,$$

and $$\cos\{\Delta\phi + 45°\} < 0 \text{ for } S_1(t) = 0$$

where $\Delta\phi = \phi(t) - \phi(t)$.

2. The apparatus of claim 1 wherein said encoder operates in the range of 0 to 200 Mb/sec.

3. The apparatus of claim 1 wherein
said carrier signal comprises a microwave subcarrier, and
said QPSK modulator comprises a microwave subcarrier modulator for modulating said microwave subcarrier.

4. The apparatus of claim 3 wherein said microwave subcarrier modular comprises
a microwave subcarrier signal source for providing an in-phase subcarrier signal and a quadrature subcarrier signal 90° out of phase with said subcarrier signal;
a first mixer circuit for mixing said in-phase subcarrier with said encoded binary data stream $d_0(t)$ and providing a first mixer subcarrier output;
a second mixer circuit for mixing said quadrature subcarrier with said encoded binary data stream $d_1(t)$ and providing a second mixer subcarrier output; and
a combiner circuit for combining said first mixer subcarrier output and said second mixer subcarrier output to provide said modulated microwave subcarrier signal.

5. The apparatus of claim 3 further comprising
an optical modulator for modulating said QPSK modulated microwave subcarrier signal on an optical carrier signal.

6. The apparatus of claim 5 further comprising an optical detector for detecting at least one said microwave subcarrier from said optical carrier signal to provide a detected subcarrier signal associated with said microwave subcarrier.

7. The apparatus of claim 6 further comprising a QPSK demodulator for recovering said pair of input data signals $S_0(t)$ and $S_1(t)$ from said detected subcarrier signal.

8. The apparatus of claim 7 wherein said QPSK demodulator comprises
a phase delay network for delaying the phase of said detected subcarrier by a predetermined phase delay and providing a phase-delayed detected subcarrier;
a phase advance network for advancing the phase of said detected subcarrier by a predetermined phase advance and providing a phase-advanced detected subcarrier, said predetermined phase delay and said predetermined phase advance each being selected such that the resulting phase difference between said phase-delayed detected subcarrier and said phase-advanced detected subcarrier is substantially 90°;
a time delay circuit for delaying said detected subcarrier by said single bit time period T to provide a time-delayed detected subcarrier;
a first demodulation mixer for mixing said phase-delayed detected subcarrier with said time-delayed detected subcarrier; and
a second demodulation mixer for mixing said phase-advanced detected subcarrier with said time-delayed detected subcarrier,
wherein the output of said first demodulation mixer represents said input data signal $S_0(t)$, and the output of said second demodulation mixer represents said input data signal $S_1(t)$.

9. The apparatus of claim 8 wherein said predetermined phase-delay is substantially 45°, and said predetermined phase-advance is substantially 45°.

10. The apparatus of claim 1 further comprising a QPSK demodulator for recovering said pair of input data signals $S_0(t)$ and $S_1(t)$ from said QPSK modulated carrier signal.

11. The apparatus of claim 10 wherein said QPSK demodulator comprises
a phase delay network for delaying the phase of said modulated carrier by a predetermined phase delay and providing a phase-delayed modulated carrier;
a phase advance network for advancing the phase of said modulated carrier by a predetermined phase advance and providing a phase-advanced modulated carrier, said predetermined phase delay and said predetermined phase advance each being selected such that the resulting phase difference between said phase-delayed modulated carrier and said phase-advanced modulated carrier is substantially 90°;
a time delay circuit for delaying said modulated by said single bit time period T to provide a time-delayed modulated Carrier;
a first demodulation mixer for mixing said phase-delayed modulated carrier with said time-delayed modulated carrier; and
a second demodulation mixer for mixing said phase-advanced modulated carrier with said time-delayed modulated carrier,
wherein the output of said first demodulation mixer represents said input data signal $S_0(t)$, and the output of said second demodulation mixer represents said input data signal $S_1(t)$.

12. The apparatus of claim 11 wherein said predetermined phase-delay is substantially 45°, and said predetermined phase-advance is substantially 45°.

13. An apparatus, comprising
an encoder for encoding a pair of synchronous binary input data streams $S_{m,0}(t)$, $S_{m,1}(t)$ associated with said subcarrier at $f_m$, each said input data stream having a single bit period T between successive data bits, into a pair of encoded binary data streams $d_{m,0}(t)$, $d_{m,1}(t)$;
said encoder further including a first time delay circuit for delaying $d_{m,0}(t)$ by a period T to produce a first time-delayed encoded signal $d_{m,0}(t-T)$;

a second time delay circuit for delaying $d_{m,1}(t)$ by a period T to produce a second time-delayed encoded signal $d_{m,1}(t-T)$; and said each said encoder further including means to enable $d_{m,0}(t)$ and $d_{m,1}(t)$ to satisfy the logical relationships $$d_{m,0}(t) = \overline{S_{m,0}(t)}\,\overline{S_{m,1}(t)}\,\overline{d_{m,0}(t-T)} + \overline{S_{m,0}(t)}\,S_{m,1}(t)\,\overline{d_{m,1}(t-T)} + S_{m,0}(t)\,\overline{S_{m,1}(t)}\,d_{m,1}(t-T) + S_{m,0}(t)\,S_{m,1}(t)\,d_{m,0}(t-T)$$

and, $$d_{m,1}(t) = \overline{S_{m,0}(t)}\,\overline{S_{m,1}(t)}\,\overline{d_{m,1}(t-T)} + \overline{S_{m,0}(t)}\,S_{m,1}(t)\,d_{m,0}(t-T) + S_{m,0}(t)\,\overline{S_{m,1}(t)}\,\overline{d_{m,0}(t-T)} + S_{m,0}(t)\,S_{m,1}(t)\,d_{m,1}(t-T);$$

a plurality of microwave subcarrier QPSK modulators each associated with a microwave subcarrier signal for modulating with the encoded binary data streams $d_{m,0}(t)$, $d_{m,1}(t)$ the phase $\phi_m(t)$ of the associated microwave subcarrier having a frequency $f_m$ and an amplitude $A_m$, where m is the index number of the microwave subcarrier, each said modulated subcarrier signal being given by $$x_m(t) = A_m \cos(2\pi f_m t + \phi(t));$$

wherein said phase $\phi(t)$ is determined by the logical values of said encoded binary data streams $d_{m,0}(t)$ and $d_{m,1}(t)$, and said encoder encodes $d_{m,0}(t)$ and $d_{m,1}(t)$ to satisfy the relationships $$\cos\{\Delta\phi - 45°\} > 0 \text{ for } S_{m,0}(t) = 1,$$

$$\cos\{\Delta\phi - 45°\} < 0 \text{ for } S_{m,0}(t) = 0,$$

$$\cos\{\Delta\phi - 45°\} > 0 \text{ for } S_{m,1}(t) = 1,$$

and $$\cos\{\Delta\phi - 45°\} < 0 \text{ for } S_{m,1}(t) = 0$$

where $\Delta\phi_m = \phi_m(t) - \phi_m(t)$.

14. The apparatus of claim 13 wherein said encoder operates in the range of 0 to 200 Mb/sec.

15. The apparatus of claim 13 wherein each said microwave subcarrier QPSK modulator comprises
a microwave subcarrier signal source for providing an in-phase subcarrier signal at said associated subcarrier frequency $f_m$, and a quadrature subcarrier signal 90° out of phase with said subcarrier signal;
a first mixer circuit for mixing said in-phase subcarrier with said encoded binary data stream $d_{m,0}(t)$ and providing a first mixer subcarrier output;
a second mixer circuit for mixing said quadrature subcarrier with said encoded binary data stream $d_{m,1}(t)$ and providing a second mixer subcarrier output; and
a combiner circuit for combining said first mixer subcarrier output and said second mixer subcarrier output to provide said modulated microwave subcarrier signal at frequency $f_m$.

16. The apparatus of claim 15 further comprising
an electro-optical modulator for combining said QPSK modulated subcarrier signals from said plurality of microwave subcarrier QPSK modulators into a composite subcarrier multiplexed signal, and for modulating said composite subcarrier multiplexed signal onto an optical carrier signal.

17. The apparatus of claim 16 further comprising
an optical detector associated with each said QPSK modulated subcarrier signal at frequency $f_m$ for detecting said associated QPSK modulated subcarrier signal from said modulated optical carrier signal to provide a detected subcarrier signal associated with said QPSK modulated subcarrier signal at $f_m$.

18. The apparatus of claim 17 further comprising
a QPSK demodulator associated with each said optical detector for recovering said pair of input data signals $S_{m,0}(t)$ and $S_{m,1}(t)$ from said associated detected subcarrier signal.

19. The apparatus of claim 18 wherein each said QPSK demodulator comprises
a phase delay network for delaying the phase of said detected subcarrier by a predetermined phase delay and providing a phase-delayed detected subcarrier;
a phase advance network for advancing the phase of said detected subcarrier by a predetermined phase advance and providing a phase-advanced detected subcarrier, said predetermined phase delay and said predetermined phase advance each being selected such that the resulting phase difference between said phase-delayed detected subcarrier and said phase-advanced detected subcarrier is substantially 90°;
a time delay circuit for delaying said detected subcarrier by said single bit time period T to provide a time-delayed detected subcarrier;
a first demodulation mixer for mixing said phase-delayed detected subcarrier with said time-delayed detected subcarrier; and
a second demodulation mixer for mixing said phase-advanced detected subcarrier with said time-delayed detected subcarrier,
wherein the output of said first demodulation mixer represents said input data signal $S_{m,0}(t)$, and the output of said second demodulation mixer represents said input data signal $S_{m,1}(t)$.

20. The apparatus of claim 19 wherein said predetermined phase-delay is substantially 45°, and said predetermined phase-advance is substantially 45°.

21. An apparatus for transferring digital data across an optical data link, comprising
an encoder for encoding a first input data signal $S_0$ and a second input data signal $S_1$ into a first encoded signal $d_0$ and second encoded signal $d_1$, said first and second input data signals being synchronous with each other and having the same single bit time period T between successive data bits;
said encoder further includes
a first time delay circuit for delaying $d_0$ by a period T to produce a first time-delayed encoded signal $d'_0$;
a second time delay circuit for delaying $d_1$ by a period T to produce a second time-delayed encoded signal $d'_1$; and
a logic circuit for producing encoded signals $d_0$ and $d_1$ from $S_0$, $S_1$, $d'_0$ and $d'_1$ according to the boolean expressions:

$$d_0 = \overline{S_0}\,\overline{S_1}\,\overline{d'_0} + \overline{S_0}\,S_1\,\overline{d'_1} + S_0\,\overline{S_1}\,d'_1 + S_0\,S_1\,d'_0$$

and, $$d_1 = \overline{S_0}\overline{S_1}\overline{d'_1} + \overline{S_0}S_1 d'_0 + S_0\overline{S_1}\overline{d'_0} + S_0 S_1 d'_1;$$

at least one subcarrier modulator for simultaneously modulating an associated subcarrier with said first and second encoded signals to produce a modulated subcarrier signal that contains two bits of information for each symbol period, said symbol period equal to said bit period T of each said input data signals $S_0$ and $S_1$;

an optical modulator for modulating at least one said modulated subcarrier signal on an optical carrier signal;

an optical detector for detecting at least one said subcarrier from said optical carrier signal to provide a detected subcarrier signal; and a demodulator for demodulating said first input data signal from said detected subcarrier signal.

22. The apparatus of claim 21 wherein said encoder operates in the range 0 to 200 Mb/sec.

23. The apparatus of claim 21 wherein said subcarrier modulator comprises
a subcarrier signal source for providing an in-phase subcarrier signal and a quadrature subcarrier signal 90° out of phase with said subcarrier signal;
a first mixer circuit for mixing said in-phase subcarrier with said first encoded signal and providing first mixer subcarrier output;
a second mixer circuit for mixing said quadrature subcarrier with said second encoded signal and providing a second mixer subcarrier output; and
a combiner circuit for combining said first mixer subcarrier output and said second mixer subcarrier output to provide said modulated subcarrier.

24. The apparatus of claim 23 wherein said demodulator comprises
a phase delay network for delaying the phase of said detected subcarrier by a predetermined phase delay and providing a phase-delayed detected subcarrier;
a phase advance network for advancing the phase of said detected subcarrier by a predetermined phase advance and providing a phase-advanced detected subcarrier, said predetermined phase delay and said predetermined phase advance each being selected such that the resulting phase difference between said phase-delayed detected subcarrier and said phase-advanced detected subcarrier is substantially 90°;
a time delay circuit for delaying said detected subcarrier by said single bit time period T to provide a time-delayed detected subcarrier;
a first demodulation mixer for mixing said phase-delayed detected subcarrier with said time-delayed detected subcarrier; and
a second demodulation mixer for mixing said phase-advanced detected subcarrier with said time-delayed detected subcarrier.

25. The apparatus of claim 24 wherein said predetermined phase-delay is substantially 45°, and said predetermined phase-advance is substantially 45°.

26. The apparatus of claim 24 further comprising
a plurality of said encoders, each said encoder associated with a said first and second input data signal, and each said encoder associated with a said first and second encoded signal;
a plurality of said subcarrier modulators, each associated with a said encoder for modulating an associated subcarrier, of a frequency different from said other subcarriers, with said first and second encoded signals associated with said associated encoder; and
a subcarrier combiner circuit to combine said plurality of modulated subcarriers to produce a composite modulated subcarrier signal;
wherein said optical modulator modulates said composite modulated subcarrier signal onto said optical carrier signal.

27. The apparatus of claim 26 wherein each said subcarrier modulator comprises
a subcarrier signal source for providing an in-phase subcarrier signal and a quadrature subcarrier signal 90° out of phase with said subcarrier signal;
a first mixer circuit for mixing said in-phase subcarrier with said first encoded signal and providing first mixer subcarrier output;
a second mixer circuit for mixing said quadrature subcarrier with said second encoded signal and providing a second mixer subcarrier output; and
a combiner circuit for combining said first mixer subcarrier output and said second mixer subcarrier output to provide said modulated subcarrier.

28. The apparatus of claim 27 further comprising
a plurality of said optical detectors each associated with one of said modulated subcarriers for detecting said associated modulated subcarrier from said optical carrier signal to provide an associated detected subcarrier signal; and
a plurality of said demodulators each associated with one of said optical detectors for demodulating said first input data signal and said second input data signal from said associated detected subcarrier signal.

29. The apparatus of claim 28 wherein each said demodulator comprises
a phase delay network for delaying the phase of said associated detected subcarrier by a predetermined phase delay and providing an associated phase-delayed detected subcarrier;
a phase advance network for advancing the phase of said associated detected subcarrier by a predetermined phase advance and providing a phase-advanced associated detected subcarrier, said predetermined phase delay and said predetermined phase advance each being selected such that the resulting phase difference between said phase-delayed associated detected subcarrier and said phase-advanced associated detected subcarrier is substantially 90°;
a time delay circuit for delaying said associated detected subcarrier by said single bit time period T to provide an associated time-delayed detected subcarrier;
a first demodulation mixer for mixing said phase-delayed associated detected subcarrier with said time-delayed associated detected subcarrier; and
a second demodulation mixer for mixing said phase-advanced associated detected subcarrier with said time-delayed associated detected subcarrier.

30. The apparatus of claim 29 wherein said predetermined phase-delay is 45°, and said predetermined phase-advance is substantially 45°.

31. An apparatus for receiving digital data from an optical data link, comprising an optical detector for detecting at least one subcarrier from a subcarrier modulated optical carrier signal to provide a detected subcarrier signal; and a demodulator for demodulating a first data signal and a second data signal from said detected subcarrier signal, said demodulator comprising (a) a phase delay network for delaying the phase of said detected subcarrier by a predetermined phase delay and providing a phase-delayed detected subcarrier;

(b) a phase advance network for advancing the phase of said detected subcarrier by a predetermined phase advance and providing a phase-advanced detected subcarrier, said predetermined phase delay and said predetermined phase advance each being selected such that the resulting phase difference between said phase-delayed detected subcarrier and said phase-advanced detected subcarrier is substantially 90°;

(c) a time delay circuit for delaying said detected subcarrier by said single bit time period T to provide a time-delayed detected subcarrier;

(d) a first demodulation mixer for mixing said phase-delayed detected subcarrier with said time-delayed detected subcarrier; and (e) a second demodulation mixer for mixing said phase-advanced detected subcarrier with said time-delayed detected subcarrier.

32. The apparatus of claim 31 wherein said predetermined phase-delay is substantially 45°, and said predetermined phase-advance is substantially 45°.

33. A method of modulating a carrier signal with digital information, comprising the steps of encoding a pair of synchronous binary input data streams $S_0$, $S_1$, into a pair of encoded binary data streams $d_0$, $d_1$, each said input stream having a single bit period between T between successive data bits;

delaying $d_0$ by a period T to produce a first time-delayed encoded signal $d'_0$;

delaying $d_1$ by a period T to produce a second time-delayed encoded signal $d'_1$; and producing encoded signals $d_0$ and $d_1$ from $S_0$, $S_1$, $d'_0$ and $d'_1$ according to the boolean expressions:

$$d_0 = \overline{S_0}\overline{S_1}\overline{d'_0} + \overline{S_0}S_1\overline{d'_1} + S_0\overline{S_1}d'_1 + S_0S_1d'_0$$

and, $$d_1 = \overline{S_0}\overline{S_1}\overline{d'_1} + \overline{S_0}S_1d'_0 + S_0\overline{S_1}\overline{d'_0} + S_0S_1d'_1;$$

modulating the phase $\phi(t)$ of at least one carrier signal having a frequency f and an amplitude A, said modulated carrier signal being given by $$x(t) = A \cos(2\pi ft + \phi(t))$$

wherein said phase $\phi(t)$ is determined by the logical values of said encoded binary data streams $d_0(t)$ and $d_1(t)$ and said encoder encodes $d_0(t)$ and $d_1(t)$ to satisfy the relationships $\cos\{\Delta\phi - 45°\} > 0$ for $S_0(t) = 1$, $\cos\{\Delta\phi - 45°\} < 0$ for $S_0(t) = 0$, $\cos\{\Delta\phi - 45°\} > 0$ for $S_1(t) = 1$, and $\cos\{\Delta\phi - 45°\} < 0$ for $S_1(t) = 0$;

where $\Delta\phi = \phi(t) - \phi(t)$.

34. The method of claim 33 wherein said carrier signal comprises a microwave subcarrier and said modulating step comprises providing an in-phase subcarrier signal and a quadrature subcarrier signal 90° out of phase with said subcarrier signal;

mixing said in-phase subcarrier with said encoded binary data stream $d_0(t)$ and providing an in-phase mixed output;

mixing said quadrature subcarrier with said encoded binary data stream $d_1(t)$ and providing a quadrature mixed output; and combining said in-phase mixed output and said quadrature mixed output to provide a QPSK modulated microwave subcarrier signal.

35. The method of claim 34 further comprising the step of modulating said QPSK modulated microwave subcarrier signal onto an optical carrier signal.

36. The method of claim 35 further the steps of detecting at least one said microwave subcarrier from said optical carrier signal to provide a detected subcarrier signal associated with said QPSK modulated microwave subcarrier; and recovering said pair of input data signals $S_0(t)$ and $S_1(t)$ from said detected subcarrier signal.

37. The method of claim 36 wherein said recovering step comprises delaying the phase of said detected subcarrier by a predetermined phase delay and providing a phase-delayed detected subcarrier;

advancing the phase of said detected subcarrier by a predetermined phase advance and providing a phase-advanced detected subcarrier, said predetermined phase delay and said predetermined phase advance each being selected such that the resulting phase difference between said phase-delayed detected subcarrier and said phase-advanced detected subcarrier is substantially 90°;

delaying in time said detected subcarrier by said single bit time period T to provide a time-delayed detected subcarrier;

mixing said phase-delayed detected subcarrier with said time-delayed detected subcarrier to produce an output representative of said input data signal $S_0(t)$; and mixing said phase-advanced detected subcarrier with said time-delayed detected subcarrier to produce an output representative of said input data signal $S_1(t)$.

* * * * *